Figure 2:
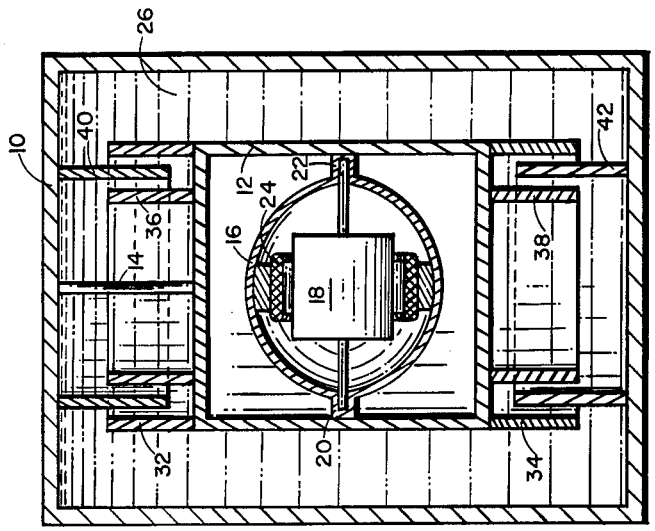

July 19, 1966     L. R. McMURRAY     3,261,212
DAMPED GYROCOMPASS
Filed July 10, 1961

INVENTOR.
LOREN R. McMURRAY
BY
*Ernest L. Brown*
ATTORNEY

United States Patent Office 3,261,212
Patented July 19, 1966

3,261,212
DAMPED GYROCOMPASS
Loren R. McMurray, Whittier, Calif., assignor to
North American Aviation, Inc.
Filed July 10, 1961, Ser. No. 122,752
2 Claims. (Cl. 74—5.5)

This invention pertains to a gyrocompass, for example a north seeking gyrocompass. More particularly, this invention pertains to a gyrocompass which is uniquely damped.

It has been discovered that partially flotation supported gyrocompasses such as—for example—the "gyroscopic surveying compass" which is described in Patent No. 2,930,240, dated March 29, 1960, to O. Rellensmann et al, tend to be in error due to horizontal translational and angular vibration. It has been discovered that the vibration may be reduced by making the center of mass and the center of buoyancy coincide.

A further significant reduction in azimuth error due to vibration has been achieved in accordance with this invention by using a damping structure on the top and bottom of the gyroscope container, symmetrically disposed within the flotation fluid.

With an enclosed gyroscope having a horizontal spin axis, partially supported by a flotation fluid and partially by a vertical member such as a string or torsion bar, the amplitude and phase angle of the gyroscope container oscillation depends upon the coupling between the gyroscope container and the outside fluid container. Increasing the coupling between the fluid container and the gyroscope container increases the driving vibration force which is transmitted to the gyroscope container and also, with the dampers of this invention, increases the damping force acting upon the gyroscope container. However, it has been discovered that the increase in damping force and the increase in driving vibration force do not increase at the same rate. Proper coupling of the dampers of this invention with the flotation fluid minimizes the gyrocompass azimuth error for the given power spectral density of vibration applied to the fluid container.

In accordance with this invention a pair of right circular cylindrical damping members are symmetrically attached to the top and bottom of the gyroscope housing with their axes coaxial with the vertical axis.

In a second embodiment more than one damping member on each end of the gyroscope housing, say three concentric cylindrical damping members having a common axis, preferably are positioned symmetrically with respect to the center of mass of the gyroscope. In each set of three concentric cylindrical damping members, the smallest and largest member are attached to the gyroscope housing coaxially with the axis of the vertical support member. The outer diameter of the smallest cylinder is less than the inner diameter of the second or intermediate cylinder and the inner diameter of the largest or outer cylinder is greater than the outer diameter of the intermediate cylinder. The intermediate cylinder is positioned between but not touching the smallest and largest cylinders and is attached to the outer fluid container.

It is therefore an object of this invention to damp a gyroscope which is partially supported by flotation fluid.

It is another object of this invention to damp a gyrocompass which uses a gyroscope that is partially supported by a flotation fluid and partially supported by a vertical member.

It is also an object of this invention to damp a north-seeking gyrocompass whose gyroscope housing is partially buoyantly supported and partially supported by a vertical member.

It is also an object of this invention to damp a gyrocompass whose center of mass and center of buoyancy coincide.

It is a more particular object of this invention to damp a gyrocompass by attaching at least one cylinder to the top and an identical cylinder to the bottom of a gyroscope housing immersed in a flotation fluid.

Figure 1:
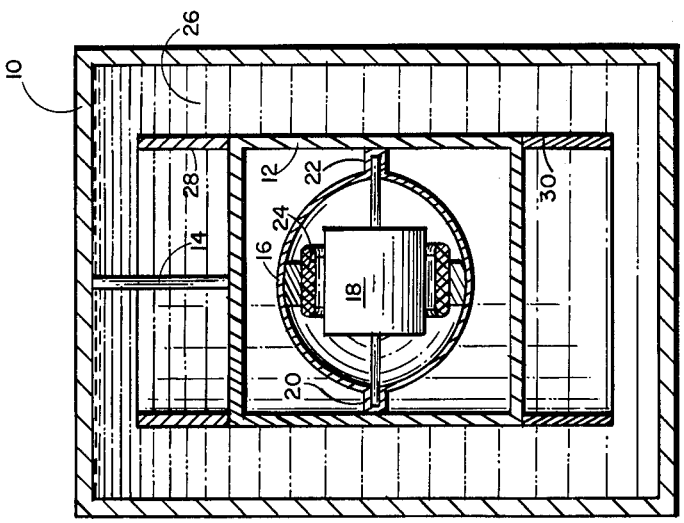

Other objects will become apparent from the following description, taken in connection with the accompanying drawings in which:

FIG. 1 is a view, partially in section, of a first embodiment of this invention; and FIG. 2 is a view, partially in section, of a second embodiment of this invention.

In the figures, a gyroscope case 12 is partially supported by a flotation fluid 26 within a fluid container 10. Additional support and constraint is provided by a vertical mechanical support member 14 which is attached between fluid container 10 and a vertical axis of symmetry of gyroscope housing 12. Support member 14 may offer angular spring restraint as in the Rellensmann patent or, alternatively be a flexible member supported upon housing 10 by a bearing (not shown). The rotor 18 of the gyroscope is supported for rotation about a substantially horizontal axis relative to gyroscope housing 12 in a pair of coaxial bearings 20 and 22. A typical electrical winding 24 is supported relative to housing 12 by a bracket 16. Electrical wiring may—for example—be connected between fluid container 10 and gyroscope housing 12 by crinkle wires or through the interior of support member 14.

In FIG. 1, a pair of dampers 28 and 30 which are right circularly cylindrical in shape and which are coaxially arranged and symmetrically positioned relative to the center of mass of housing 12 are positioned upon the top and bottom, respectively, of gyroscope housing 12.

The center of mass, center of buoyancy, center of velocity responsive forces, and center of acceleration responsive forces of housing 12, its contents, and its dampers preferably should coincide.

In FIG. 2, a set of three concentric right circular cylinders 32, 36, and 40 are positioned at the top of gyroscope housing 12 and a similar set of three concentric cylinders 34, 38, and 42 are positioned coaxially with cylinders 32, 36, and 40 at the bottom of gyroscope housing 12. Cylinders 32 and 36 are attached to the top of housing 12, cylinder 40 is attached to the top of substantially fixed fluid housing 10, cylinders 34 and 38 are attached to the bottom of gyroscope housing 12, and cylinder 42 is attached to the bottom of fluid housing 10. Cylinders 32 and 34 are identical, cylinders 36 and 38 are identical, and cylinders 40 and 42 are identical. All of the cylinders are coaxial with the axis of support member 14. The outer diameter of cylinders 36 and 38 is less than the inner diameter of cylinders 40 and 42. The inner diameter of cylinders 32 and 34 is greater than the outer diameter of cylinders 40 and 42. Fixed cylinders 40 and 42 are thus juxtaposed between and concentric with cylinders 32, 36, and cylinders 34, 38, respectively.

In each of FIGS. 1 and 2 the plane of symmetry is substantially horizontal and preferably coincides with both the center of mass and buoyancy.

For one gyrocompass and power spectral density of vibration, the desirable distance between the size of gyroscope container 12 and fluid container 10 was of the order of 1.25 centimeters while the total desirable length of damping cylinders 28 and 30 and gyroscope housing 12 was 50 centimeters.

Thus the device of this invention damps a gyrocompass against external vibration to reduce azimuth error.

Although the device of this invention has been described in detail it is not intended that the invention should be limited thereby but only in accordance with the spirit and scope of the appended claims.

I claim:
1. In a gyroscope having a gyroscope housing and a fluid housing, said gyroscope housing at least partially supported by a flotation fluid and partially supported by a flexible vertical mechanical member, the improvement comprising:
 flotation fluid filling the region between said fluid housing and said gyroscope housing;
 at least one pair of identical right circular cylindrical dampers engaging said fluid, positioned coaxially upon the top and bottom of said gyroscope housing and symmetrically with respect to the center of mass of said gyroscope, cylindrical dampers, and gyroscope housing.
2. In a directional gyroscope having a gyroscope housing and a fluid housing, said gyroscope housing at least partially supported by a flotation fluid and partially by a flexible vertical mechanical support member, the improvement characterized by the combination of:
 flotation fluid surrounding said gyroscope;
 at least one pair of identical right circular cylinders engaging said fluid, coaxially and symmetrically attached to the top and bottom of said gyroscope, respectively;
 at least one pair of identical right circular cylinders of smaller radius than said first cylinders engaging said fluid, attached to the top and bottom of said gyroscope housing concentrically with said first mentioned cylinders.

References Cited by the Examiner
UNITED STATES PATENTS

| | | | |
|---|---|---|---|
| 2,690,014 | 9/1954 | Draper et al. | 74—5.5 X |
| 2,805,578 | 9/1957 | Wright | 74—5.5 |
| 2,834,213 | 5/1958 | Fredericks | 74—5.5 |
| 2,900,823 | 8/1959 | White | 74—5.5 |
| 2,945,380 | 7/1960 | Pope et al. | 74—5 |
| 3,065,641 | 11/1962 | Stiles | 74—5 |

MILTON KAUFMAN, *Primary Examiner.*

BROUGHTON G. DURHAM, *Examiner.*

K. DOOD, T. W. SHEAR, *Assistant Examiners.*